Jan. 10, 1967        J. J. SMITH ETAL        3,296,860
SIMPLIFIED METER SETTING INCLUDING RIGID METER BAR
Filed June 4, 1964                              2 Sheets-Sheet 1
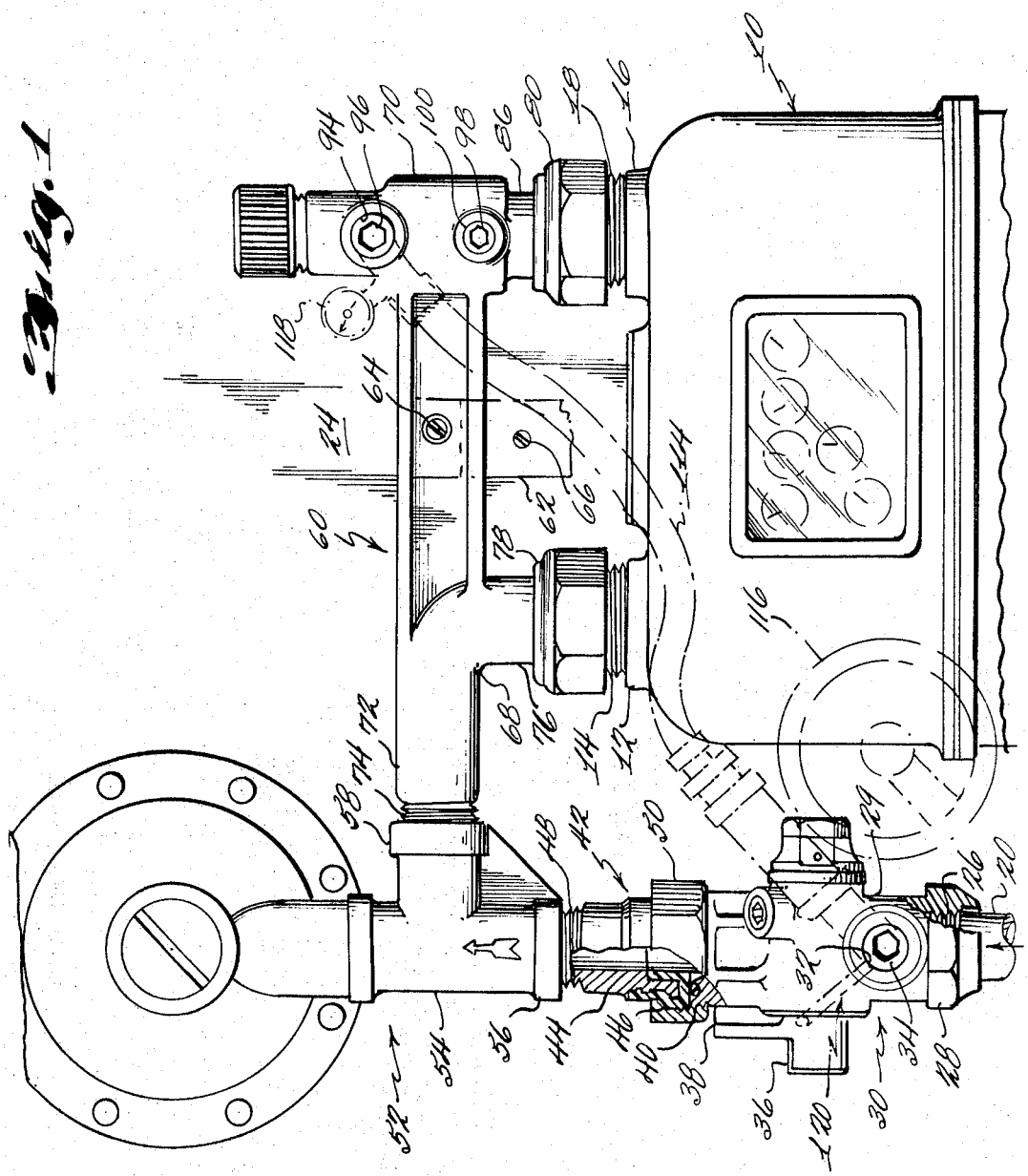
INVENTORS
JOHN J. SMITH
LAWRENCE F. LUCKENBILL
BY
Cushman, Darby & Cushman
ATTORNEYS

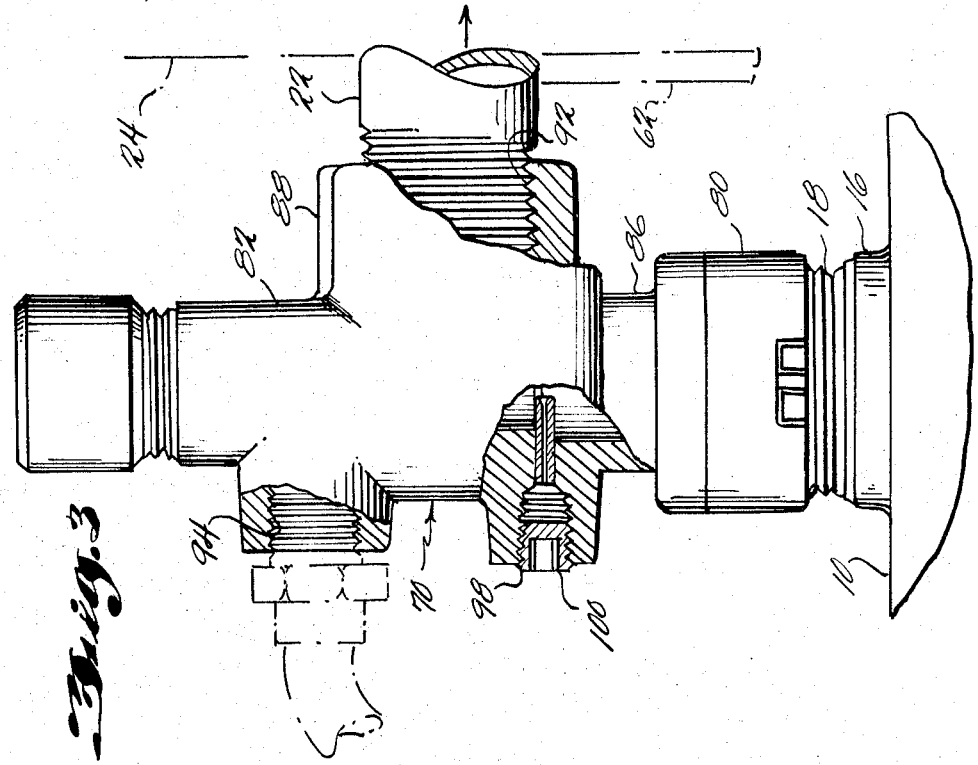
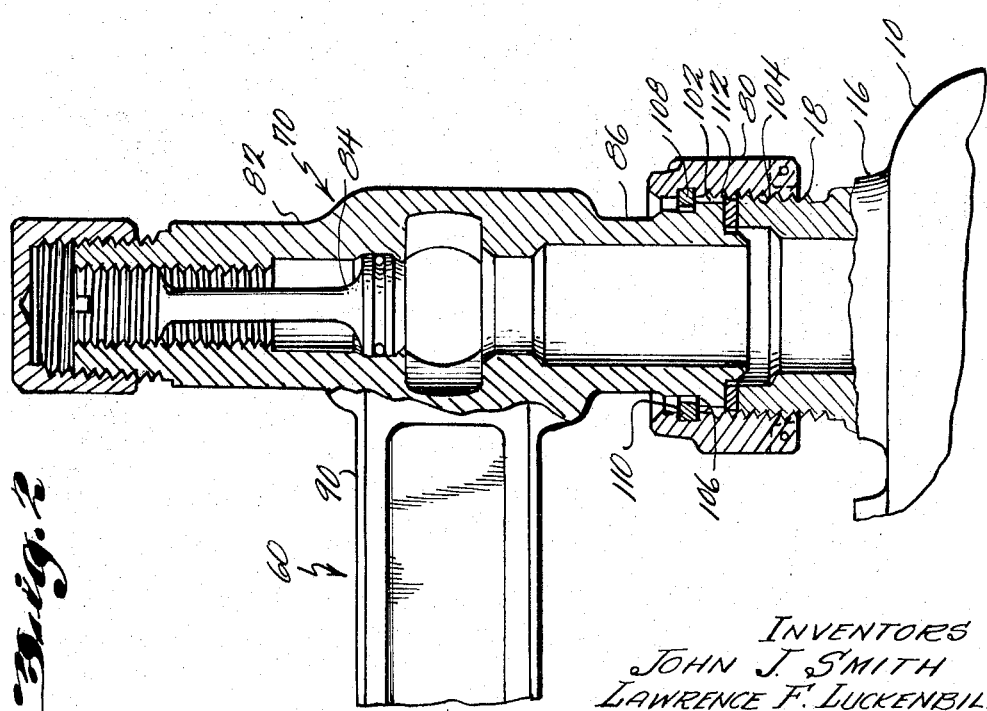

United States Patent Office 3,296,860
Patented Jan. 10, 1967

3,296,860
SIMPLIFIED METER SETTING INCLUDING
RIGID METER BAR
John J. Smith and Lawrence F. Luckenbill, Decatur, Ill.,
assignors to Mueller Co., Decatur, Ill., a corporation
of Illinois
Filed June 4, 1964, Ser. No. 372,469
5 Claims. (Cl. 73—201)

The present invention relates to a meter installation or setting and, more particularly, to an improved arrangement including a rigid meter bar whereby the same can be more easily installed or removed and replaced between a gas supply line and a service line for a dwelling or the like. Ancillary, the invention relates to a meter installation or setting having an improved rigid meter bar enabling the quick removing and replacing of a meter.

In various installations heretofore used in connecting a gas meter between a gas supply line and the service line considerable labor and materials were used in order to connect the various elements of the meter setting such as an inlet stop or valve, pressure regulators, meter bars, meter and the like. The prior meter settings involved connecting a great number of pipe joints to properly attach the various elements of the setting. The use of a great number of joints in various arrangements did not give rise to standardization of installation procedure. With the continual rise in the cost of labor and material, the prior installations or settings for gas meters and the removal and replacement of such gas meters from the settings has become a concern of the gas utility companies as such cost must be reflected in their charges to the customer.

It is, therefore, an object of the present invention to provide an improved simplified modernized meter setting which can be prefabricated except for the gas meter and initially installed between a gas supply line and the service line of a dwelling with the use of a minimum of joints, parts and labor. By prefabricating the meter setting in the shop, there is standardization of assembly and resulting economy to the utility companies.

An object and important advantage of the present invention is that the meter setting enables easy replacement and repair of the pressure regulator as well as the gas meter regulator and the meter in to the meter setting.

Another object of the present invention is to provide an improved by-pass type meter setting wherein a pressure regulator or a gas meter may be removed and replaced without interruption or service and without causing a fluid surge in the service line to the dwelling or the like, the removal and replacement of the pressure regulator or meter being accomplished after connection of a by-pass line and operation of suitable valves on the upstream and downstream side of the meter by a minimum of labor.

A still further object of the present invention is to provide an improved meter setting in which the gas meter can be easily installed in confined areas and also be easily removed and replaced when service to the meter is necessary.

Another object of the present invention is to provide an improved arrangement of by-pass type meter settings in which the meter can be installed or removed and replaced by persons of limited skill with a minimum of instruction.

Another object of the present invention is to provide an improved type of meter setting which enables the connection of a meter and its ancillary equipment such as upstream and downstream valves without the provision of numerous elbows, joints or the like, especially when the gas supply line is located in close proximity to the service line for a dwelling or building and where the service line extends perpendicular from a wall of the dwelling or building.

Yet a still further object of the present invention is to provide a by-pass type meter setting that is simple in construction and installation with resulting economies of manufacture and labor.

Another object of the present invention is to provide an improved type of meter bar in which the meter is connected directly thereto by coupling nuts without the provision of additional nipples or swivel extensions and, further, which is so arranged that it may be connected directly to a service line extending perpendicularly from a wall of a dwelling or building.

These and other objects and advantages of the present invention will be more clearly understood from the following detailed specification, claims and the attached drawings, wherein:

FIGURE 1 is a fragmentary elevational view of a meter setting embodying the present invention, the view being partly in section and illustrating in broken lines the position of a by-pass line when connected to the by-pass ports of the by-pass inlet stop or valve and the by-pass outlet valve fitting respectively;

FIGURE 2 is an enlarged vertical sectional view of the outlet meter valve fitting of the meter bar, the view illustrating in elevation a portion of the meter bar and a portion of the meter connected thereto; and FIGURE 3 is a side elevational view of the outlet meter valve fitting of FIGURE 2, partly in section, and looking from the right of either FIGURE 1 or FIGURE 2.

Referring now to the drawings wherein like character reference numerals represent like or similar parts, a conventional gas meter 10 has an inlet conduit 12 which is exteriorly threaded as indicated at 14 and an outlet conduit 16 which is also exteriorly threaded as indicated at 18. The inlet and outlet conduits 12 and 16 project vertically upwardly from the meter in spaced relationship to each other, the conduits having parallel axes. A gas supply line 20 extending from a source of supply (not shown) extends vertically and is in close proximity to a service line 22 (hidden in FIGURE 1 but shown in FIGURE 3) projecting horizontally from a wall 24 of a dwelling or building (not shown). The service line 22 supplies the gas to the housing piping (not shown).

As best shown in FIGURE 1, the gas supply line or riser pipe 20 is exteriorly threaded at 26 and is connected to the interiorly threaded inlet 28 of a valve body 29 of by-pass fitting or meter stop generally designated at 30. The by-pass fitting or meter stop 30 is a rotary plug valve similar to the one disclosed in the U.S. patent to Mueller, No. 2,653,791 but is further provided with a by-pass port 32 on the valve body 29 upstream of the rotary plug, the by-pass port 32 normally being closed by a removable plug 34. In more detail, the inlet by-pass fitting or meter stop 30 may be of the type disclosed in the copending application of Frank H. Mueller and John J. Smith filed December 17, 1963, and Serially Numbered 331,212 and to this extent the subject matter of that application is incorporated by reference herein. This meter stop 30 has a wrench engageable extension 36 for its rotary plug which enables the rotary plug to be rotated between a position for through flow from its inlet 28 to its outlet 38, and a closed position where there can be no through flow but full flow through the by-pass port 32 when the same is open and connected by a by-pass meter line as described later in the specification. The meter stop 30 is provided with exterior threads 40 on the outlet 38 of its valve body 29.

Connected to the outlet 38 on the downstream side of the meter stop 30 is an insulated coupling generally designated by the numeral 42. The insulated coupling 42 which is similar to the type disclosed in U.S. Patent 3,115,-354 issued December 24, 1963, to Walter J. Bowan et al. includes a tailpiece sub or hollow body 44 having an annular enlargement 46 at its inlet end and exterior threads 48 at its outlet end. The coupling 42 is provided with a ring or coupling nut 50 interiorly threaded along a portion of its bore and arranged to rotate relative to the tailpiece sub or hollow body 44 and cooperate with the enlargement 46. The coupling nut 50 is threaded onto the exterior threads 40 of the outlet 38 of the valve body 29 of meter stop 30.

A pressure regulator 52 of the corner type has an elbow shaped body 54 with an inlet end 56 which is interiorly threaded and an outlet end 58 which is also interiorly threaded. The pressure regulator is utilized in those meter settings wherein there is a source of high pressure for the gas supply line 20 and such pressure must be reduced or lowered prior to entering the gas meter 10 and the dwelling or building. In those installations where a pressure regulator is not utilized, then a conventional elbow interiorly threaded at its inlet and outlet ends is used in place of the regulator in the meter setting of the present invention.

A meter bar generally designated at 60 is provided with a bracket 62 fixedly connected thereto by a bolt 64 or the like, the bracket enabling the meter bar 60 to be supported from the vertical wall 24 as indicated at 66. Meter bar 60 embodies an integral elbow type inlet fitting 68 and an integral outlet valve fitting 70, which will be described more fully later in the specification. The inlet fitting 68 has an inlet end 72 which is exteriorly threaded as indicated at 74, the inlet end being threadedly received into the interior threaded outlet end 58 of the elbow shaped body 54 of pressure regulator 52. An outlet end 76 of the inlet fitting 68 is provided with a ring or coupling nut 78, the coupling nut being interiorly threaded for receiving the exterior threads 14 of the inlet 12 to the gas meter 10. A more complete description of the coupling nut 78 will follow later in the specification during the description of the outlet fitting 70 as a ring or coupling nut 80 of the outlet fitting 70 is identical to the nut 78.

Referring now to FIGURES 2 and 3 the outlet meter valve fitting 70 of the meter bar 60 is somewhat similar to the type disclosed in the copending application of Wilbur R. Leopold, Jr. and John J. Smith, filed December 17, 1963, and Serially Numbered 331,213 in that it includes a valve body 82 having a spool valve 84 therein. The valve body 82 includes an inlet end 86 and an outlet end 88 arranged at 90° with respect to each other, the outlet end 88 having an axis which is also perpendicular to the longitudinal axis of the rail-like center portion 90 integrally connecting inlet fitting 68 to the outlet fitting 70. The outlet end 88 of the valve body 82 is interiorly threaded as indicated at 92 (FIGURE 3) so that it may be threaded onto the exterior threads of the service pipe 22. By such an arrangement of the outlet end 88 of the meter bar 60 where it extends rearward with respect to a meter supported by the meter bar, the installation of the meter at its point of use is compact and allows the same to be positioned closely adjacent the wall 24.

Additionally, the valve body 82 of outlet fitting 70 is provided with an exteriorly threaded by-pass port 94 normally closed by a detachable threaded plug 96 (FIGURE 1). A purge port 98 closed by a detachable threaded plug 100 is used during operation of providing a by-pass of the meter when removing and replacing the same as described in the aforementioned Leopold and Smith application, Serial No. 331,213.

The inlet end 86 of the outlet fitting 70 is provided with an annular enlargement 102. The coupling nut 80 which has interior threads 104 along a portion of its bore 106 is arranged to pass over the enlargement 102. However, coupling nut 80 is provided with an annular recess 108 in its bore 106, the recess 108 being arranged to receive a split lock ring or wire 110 so as to provide means on the coupling nut for engaging the enlargement 102. As is now evident from FIGURE 2, the coupling nut 80 is threaded onto the exterior threads 18 of outlet 16 on meter 10, there being provided an annular gasket 112 between the end of the enlargement 102 and the end of the outlet 16. The construction of coupling nut 78 on the elbow type inlet fitting 68 as heretofore mentioned is made identically with the coupling nut 80 and, therefore, a detailed description of the same is not necessary. By having the coupling nuts 78 and 80 provided directly on the outlet end 76 of the inlet fitting 68 and the inlet end 86 of the outlet fitting 70 respectively, additional swivels as heretofore used to provide a connection between the meter and rigid meter bar are eliminated, thus reducing the cost of the meter bar.

Referring back to FIGURE 1, a by-pass line 114 is shown in broken lines extending from the by-pass port 32 in the meter stop 30 to the by-pass port 94 in the outlet fitting 70. The by-pass line 114 includes a pressure regulator 116 and pressure gauge 118 as well as a tool 120 for opening the by-pass port 32. A more complete disclosure of the by-pass line 114 and its various elements as well as a more complete disclosure of the by-pass operation in the removal and installation of a meter is found in the aforementioned copending application Serial No. 331,213 and need not be repeated herein.

The initial installation of the meter 10 is best accomplished in the following manner. The meter bar 60, pressure regulator 52 and insulated coupling 42 are assembled or prefabricated in the shop as a unit. This materially reduces labor at the site of installation as the three elements as a unit are threaded onto the service line 22 and properly oriented so that the outlet 76 of the elbow type inlet fitting 68 and the inlet 86 of the outlet fitting 70 project vertically downwardly along with the insulated coupling. Once this connection has been made, the meter stop or valve 30 is threaded onto the end of the supply line 20. The only connection remaining, other than the meter 10 to the meter bar 60, is the connection between the insulated coupling 42 and the outlet end of the meter stop or valve 30. This can be quite easily accomplished by means of the coupling nut 50 on the coupling 42 which can be rotated relative to the hollow body or tailpiece sub 44. With the assembly of the elements as described above complete then the bracket 62 of the meter bar 60 can be secured to the wall 24 so that the arrangement can easily support the weight of the meter 10. After securing the bracket 62, it is a simple matter to attach the meter 10 to the respective outlet 76 of inlet fitting 78 and inlet 86 of outlet fitting 70 as the coupling or ring nuts 78 and 80 respectively are threaded onto the respective inlet and outlet fittings 12 and 16 of the meter 10. It will now be seen that there are only four elements, other than the meter, necessary to connect the supply line 20 to the service line 22, thus, reducing the initial installation time of a meter setting.

When it is necessary to service the meter, the meter by-pass line 114 is attached in the manner described in the aforementioned application Serial No. 331,212 and after the valves 30 and 70 have been operated to provide for the flow of gas to by-pass the meter without interruption of the gas to the service line, then the meter can be disconnected from the inlet and outlet fittings 68 and 70 through use of the coupling nuts 78 and 80 respectively and repaired and then reinstalled.

It will thus be seen that the objects of this invention have been fully and effectively accomplished by the gas meter installation or setting described above and illustrated in the drawings. However, it will be realized that the foregoing specific embodiments have been shown and described for the purpose of illustrating the principles of this invention and are subject to some changes without departing from such principles.

Therefore, the terminology used throughout the specification is for the purpose of description and not limita-

What is claimed is:

1. An improvement in a by-pass type fluid meter setting for connecting a gas supply line to a service line of a dwelling or the like comprising: a fluid meter having an exteriorly threaded inlet and an exteriorly threaded outlet spaced from and extending parallel to the inlet; a rotary plug valve connected to the supply line upstream of the meter, said rotary plug valve including a valve body having an interiorly threaded inlet for connection to a threaded end of the supply line, an exteriorly threaded outlet, and a by-pass port with a removable closure therein; coupling means including a hollow body portion having exterior threads at one end thereof, an enlargement at the other end thereof, and a coupling nut cooperating with said enlargement and having interior threads threadedly received on the exterior threads of the outlet of said rotary plug valve; a pressure regulator including an elbow shaped body having an interiorly threaded inlet for threadedly receiving the exteriorly threaded end of the body portion of said coupling means and an interiorly threaded outlet; an elbow type meter inlet fitting having exterior threads at the inlet end thereof for engagement with the interior threads in the outlet of the body portion of said pressure regulator and an enlargement at the outlet end thereof and an interiorly threaded coupling nut on the outlet end cooperating with said enlargement, said interiorly threaded coupling nut being threaded onto the exteriorly threaded inlet of said meter; an outlet meter fitting valve having a valve body with an inlet end and an outlet end, said inlet end having an enlargement thereon and an interiorly threaded coupling nut thereon cooperating with said enlargement, said coupling nut being threaded onto the exterior threads of the outlet of said meter, said outlet end of the valve body of said outlet meter fitting valve having interior threads engaging exterior threads on the service line, said valve body further having a by-pass port and a removable closure for said port, and a by-pass line detachably connectable to and between the by-pass port of said rotary plug valve and the by-pass port of said outlet meter fitting valve.

2. The structure defined in claim 1 in which said inlet end of said elbow type meter inlet fitting has an axis parallel to the longitudinal axis of said meter bar and in which said outlet meter fitting valve has its interiorly threaded other end extending rearwardly of the meter and having an axis transverse of the longitudinal axis of the meter bar.

3. The structure defined in claim 1 including a meter bar extending between and integral with said elbow type meter inlet fitting and the valve body of said meter outlet fitting valve.

4. The structure defined in claim 1 in which the outlet of the valve body of said meter outlet fitting valve has an axis extending at 90° to the axis of the inlet of the same, the outlet of the valve body of said meter outlet fitting valve extending rearwardly of the meter when the meter is connected to the valve body.

5. The structure defined in claim 1 including a gasket between the inlet of said meter and the enlargement on said elbow type inlet fitting and a gasket between the outlet of said meter and the enlargement on the inlet of the valve body of said meter outlet fitting valve.

References Cited by the Examiner

UNITED STATES PATENTS

| 764,603 | 7/1904 | Lambert. | |
| 802,436 | 10/1905 | Van Order | 73—201 X |
| 1,217,804 | 2/1917 | Metzger | 285—415 X |
| 2,026,674 | 1/1936 | Edwards | 285—415 X |
| 2,569,333 | 9/1951 | Peterson | 285—415 X |
| 2,724,968 | 11/1955 | Greene | 73—201 |
| 3,173,295 | 3/1965 | Magleby | 73—201 |

FOREIGN PATENTS

| 1,122,745 | 5/1956 | France. |

RICHARD C. QUEISSER, *Primary Examiner.*

E. D. GILHOOLY, *Assistant Examiner.*